April 21, 1970     R. A. BAKER     3,508,122
ELECTROLYTIC CAPACITOR
Filed March 19, 1968
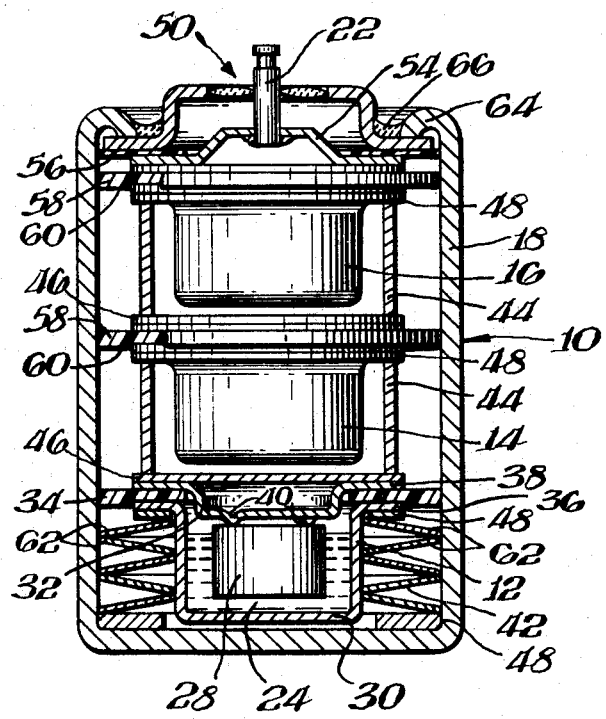

United States Patent Office 3,508,122
Patented Apr. 21, 1970

3,508,122
ELECTROLYTIC CAPACITOR
Ronald A. Baker, Williamstown, Mass., assignor to Sprague Electric Company, North Adams, Mass., a corporation of Massachusetts
Filed Mar. 19, 1968, Ser. No. 714,294
Int. Cl. H01g 1/00
U.S. Cl. 317—230    10 Claims

ABSTRACT OF THE DISCLOSURE

A plurality of electrolytic capacitor cells are enclosed within a tubular container with a compressive means disposed around the cell body for exerting an inline force on peripheral sealing flanges of the cells.

BACKGROUND OF THE INVENTION

This invention pertains to electrolytic capacitors and more particularly to a wet pellet capacitor having an electrolytic cell sealed by a compressive load within a container.

Wet pellet type capacitors generally utilize one or more cells each enclosing a valve metal pellet and a liquid electrolyte. The cell is sealed by curling or mechanically forming its top cap around a flange of the cell body, and the seal is maintained within a closed outer container by a compressive load exerted across the cell body.

Curling of the top cap and compressive loading of the cell body causes stressing and distortion of its valve metal cap which results in damage of the latter's fragile oxide film. In turn, this results in increased electrical leakage and excessive gassing during self repair or healing of the damaged oxide surface. The gas pressure, in turn, causes additional stress and film damage which enhances further gassing and leads to rupture of the cell with expulsion of electrolyte into the outer container in some cases, depending upon the plane of operation.

Compressive loading of the prior art structure is generally provided by individual spring washers disposed at the top and bottom of each cell. For compactness, or in this case minimum length of the unit, the springs have low displacement and consequently any decrease in cell length, for example due to cold flow of the cell gasket, or any increase in the length of outer container, for example from temperature gradients or stress creepage of the material provides a very large reduction in the compressive load of each cell and enhances expulsion of the electrolyte into the outer container.

Furthermore, curling of the cell cap requires close tolerance control and increased cost, and more importantly does not readily permit salvage of the more expensive parts such as the tantalum cap and silver or bimetal cell body.

One object of the present invention is to provide an inexpensive electrolytic capacitor designed for operation up to 200° C.

Another object of the present invention is to provide an electrolytic capacitor having distortion free compressive loading of the cells.

A further object of the present invention is to provide an electrolytic capacitor having a wet pellet cell which is sealed by distortion free load of the cell flanges.

A still further object of the present invention is to provide an electrolytic capacitor having salvageable parts.

A further object is to provide an electrolytic capacitor having a cell capable of self-venting at a predetermined internal pressure for nondetrimental release of gas from the cell during capacitor aging.

A still further object is to provide a wet pellet capacitor having a high displacement spring system disposed in a compact arrangement around the cell body for maintaining a distortion free compressive force uniformly distributed on the cell flanges.

SUMMARY OF THE INVENTION

A capacitor constructed in accordance with the invention comprises at least one electrolytic capacitor cell enclosed within an outer container, said cell having a pair of body members of different polarity joined together at peripheral flanges thereof with an insulative gasket therebetween, and a compressive means is disposed within said outer container for providing a compressive load solely on said flanges for exerting a sealing force thereon.

In a more limited sense, the novel capacitor comprises at least one electrolytic cell disposed within an outer container, said cell having a cathodic cup and an anodic cap joined together at peripheral flanges thereof with an insulative gasket between said flanges, a spring system is disposed around the body of said cup and between its flange and one end of the container, and the flange of said cap is fixedly positioned within said outer container to compress said spring and maintain a sealing force on said flanges.

BRIEF DESCRIPTION OF THE DRAWING

The drawing is a side view partly in section of an electrolytic device constructed in accordance with the invention.

DESCRIPTION OF THE PREFERRED EMBODIMENTS

The electrolyte capacitor 10 utilizes three electrolytic cells 12, 14 and 16 enclosed within an open ended container 18. Cells 12, 14 and 16 provide a series string of capacitors with container 18 providing the negative polarity of the assembly and terminal 22 providing the positive polarity. Container 18 is conventionally made of conductive material such as steel or the like.

Each cell contains an electrolyte 24, such as sulphuric acid or the like, and a porous anode pellet 28 of film forming metal such as tantalum or the like. The cell enclosure is made up of a pair of members joined at peripheral flanges and includes a cup shaped body 30 and a top cap 32, with an insulative gasket 34 disposed between peripheral flanges 36 and 38 of members 30 and 32 respectively.

Cap 32 is of valve metal such as tantalum or the like, and is joined to pellet 28 at one or more points as shown at 40, by welding or the like, to provide the cell anode. The cathodic portion of the cell is provided by cup 30 which is of material such as silver or a bimetallic having a silver inner face, or the like.

In the novel structure, stress of the cell and consequent damage of its oxide film is eliminated by mounting the cells in an unsealed state within container 18 where a compressive load is uniformly applied to the flanges in a distortion free manner, for example, by spring system 42 in cooperation with spacer sleeves 44 and container 18. Hence, each cell is sealed by a distortion free uniformly distributed load resulting from a in line compressive force exerted solely on the flanges of the cells which press them against resilient gasket 34.

Bending and twisting stress of the anodic cap 32 is further reduced in the inventive structure by dishing cap 32 so that the central portion of the cap is not coplanar with its flanges. This dished structure offers much more rigidity and resistance against deflections caused by the flange load. That is flange distortion will not be transmitted through the side walls to the bottom of the dish. It should also be noted that the dished cap configuration permits centering of the cap within the seal gasket and radially spaces cap 32 from container 18.

In the preferred embodiment, reinforcement of the cap is provided by a washer member 46 of stainless steel or the like which overlies cap 32 in contact with its flanges. Hence, cap 32 may be made thin to conserve material. Similarly, cup flange 36 and the bottom of container 18 are also strengthened in the preferred embodiment by washer member 48.

In this embodiment, spring assembly 42 is disposed around the cathode cup 30 of cell 12 and exerts a force between the bottom of container 18 and flange 36 with spacers 44 transmitting the load through each of the other cell flanges to the terminal seal 50 which closes the top of the container. As illustrated, each spacer 44 rests on the flange of the cell beneath it and is slightly longer than the cathodic cup it surrounds so that the load is solely on the flanges. This arrangement provides a uniformly distributed load normal to the flanges which minimizes distortion and provides an excellent seal which is also capable of venting under high internal pressure. In this structure, the anodic flange of each cell is substantially fixedly positioned with respect to the container at a point which compresses the high displacement spring 42 so that an in-line sealing force is constantly maintained on the cell flanges. Stated otherwise, the spring is placed under compression during assembly so that it continually urges the cathodic flange towards the anodic flange of each cell and against the interposed gasket.

Cathodic connection of the string of capacitor cells is provided in this embodiment by pressure contact of spring system 42 between the cathodic flange of the bottom cell and the container. Whereas anodic connection of the string is provided by a contact member 54 or the like which is connected to terminal 22 and in pressure contact with the anodic flange of the top cell 16. The top of the cell string is fixed with respect to the container and in this case is spaced from the end of container 18 by an insulative washer 56 which is interposed between seal 50 and the peripheral flange of member 54. It should be noted, that contact member 54 also reinforces and strengthens the anodic flange of the uppermost cell.

Since the cells are arranged in a series string, the cathodic cup of cells 14 and 16 are in connection to the anodic cap of the respective cell beneath them and are insulated from container 18. In this embodiment, sealing gasket 58 of cells 14 and 16 not only center their anodic caps but also include a raised peripheral rim 60 which extends alongside and surrounds the edge of the cathodic flange so as to center the cathodic section of the cell.

Hence, gaskets 58 centers and insulates both the anodic and the cathodic section from container 18 while it also insulates each section from each other. Of course, other spacing could be employed. For example, separate insulative washers or a sleeve (not shown) could be employed to space cathode flanges 36 or spaced sleeves 44 from the container 18. Additionally, gasket 58 may also be employed for the lowermost cell in place of gasket 34 or in place of insulator 56. However, a simple flat insulative washer is preferred in these places for reasons of economy. Preferably, insulative means 34, 56 and 58 are made of material, such as polytetrafluoroethylene or the like, which is compatible to the electrolyte and the high temperature requirements of the system.

Advantageously, arrangement of the spring around the cell provides a particularly compact unit since it utilizes previously unused space of the container. More importantly, it also permits the use of high displacement spring systems which were excluded in prior art construction due to their long closed length. Hence, the inventive construction allows the use of Belleville, helical or wave type springs have infinitely greater displacement within the same length container than previously possible, and moreover, allows a wide variation in spring materials since a spring system employing large volume can be designed for lower material stress. The latter is an important consideration due to the desired operating temperature of 200° C.

Preferably, spring assembly 42 is made up of a plurality of spring washers 62 such as Belleville springs which center the cathode cup 30 and provide connection of it to the bottom of the unit. This spring assembly provides a versatile unit which permits construction of units having different numbers of cells, etc., by simply varying the number or stacking of Belleville washers 62. Thus identical washers may be stacked in series or parallel arrangements, or combinations of these, to provide a wide variation in load and deflection parameters. Large deflection with substantially constant load (the load of a single washer) may be achieved by series stacking as shown in the spring assembly of the drawing. This large displacement enables the spring to chase up any cold flow of gaskets, etc., while maintaining a substantially constant in line force on the cell flanges. This is a very important factor when using such materials as polytetrafluoroethylene with inherent cold flow characteristics.

It should be noted that the spacing between spring washers 62 is exaggerated for purposes of illustration and normally there is very little separation under load. Advantageously, the versatile spring unit also allows precise control of the compressive load on the flanges, and since they are sealed only by this load allows the seal of each cell to operate as an automatic venting means. Hence the load can be such that when the internal gas pressure of the cell reaches a critical point during aging excessive gas escapes from the seal of the cell without detrimental stress.

Many different arrangements are possible. For example, although the displacement achieved from a spring assembly surrounding one cell is normally sufficient to insure maintaining of a proper load during life (that is due to flow of gasket materials, thermal expansion and contraction, or material creepage, etc.) spring assemblies may be utilized around any or all of the cells in place of spacer sleeves 44 to accommodate a long string of cells. Of course, springs disposed around other than the bottom cells must be insulated from case 18.

In the preferred embodiment, spring system 42 also maintains centering of cathodic cup 30 of the lower cell. Hence, washers 62 are designed to allow only a slight clearance, for example, .005 inch, in their compressed state between their outer diameter and the inner wall of container 18 and their inner diameter and cup 30.

The inventive unit may be assembled in many different ways. For example, each cell may be actually assembled within the container. Hence a cathode cup may be placed in position on spring assembly 42 with an insulative gasket 34 positioned on its flange. The cup is then filled to a prescribed height with electrolyte, and the anodic cap of the cell is placed on gasket 34. Thereafter a spacer sleeve 52 is placed on the anode cap and the cell assembly repeated until the desired number of cells has been built up within the casing. A terminal seal 50 is then placed in the open end of container 18 with its contact member 54 in connection to the anodic flange of the uppermost cell. The end of the container is then rolled over as at 64 to mechanically trap the seal 50 in place and compress spring 42 which loads the cell flanges. Finally, seal 50 is joined to the housing by solder 66.

In an alternative method, a push rod is inserted through an opening (not shown) in the bottom of the container 18 to allow insertion of previously assembled cells or assembly at the top of the container. In this case, each cell is moved toward the bottom of the container as the succeeding cell is inserted, and cell assembly is repeated until the stack is complete. The push rod is then removed and seal 50 fitted in place. The unit is then aged and finally the rod opening, which is used as a vent, is then closed by solder or the like.

Many different modifications of the present invention are possible without departing from the spirit and scope of the invention described herein, and thus it should be understood that the invention is not to be limited except as set forth in the appended claims.

What is claimed is:

1. An electrolytic capacitor comprising at least one electrolytic capacitor cell disposed within an outer container which is sealed at its open end by a feed-thru terminal member; said cell comprising a cathodic and an anodic member joined at peripheral flanges thereof with an insulative gasket disposed therebetween, said cathodic member in electrical communication with said container, and said anodic member in electrical communication with said terminal; and compressive means disposed within said container in engagement solely with said flanges for urging said flanges together and maintaining a substantially distortion free sealing force.

2. The capacitor of claim 1 wherein said gasket extends beyond the perimeter of the flange of at least one member and engages the inner wall of said outer container for radially locating said member therein.

3. The capacitor of claim 1 wherein said cathodic member is a cup shaped member carrying a peripheral flange at its open end, the anodic flange is substantially fixedly positioned within said container, and said compressive means includes a spring system disposed around the cathodic cup body and compressed between the cathodic flange and one end of the container for urging said cathodic flange toward said anodic flange and maintaining a sealing force solely on said flanges.

4. The capacitor of claim 3 wherein said spring system is a high displacement spring system adapted to permit a large linear movement of the cathodic flange with only slight variation in compressive load thereon.

5. The capacitor of claim 3 wherein said anodic member is a dished member having a central portion depressed from the plane of its peripheral flange and extended within the open end of said cup.

6. The capacitor of claim 5 wherein said gasket has a central opening fitted to said depressed portion of said dished member and a rim portion fitted to the perimeter of said cup flange for radially locating both cell members with respect to one another and said outer container.

7. The capacitor of claim 3 including a plurality of said cells stacked over one another with the cathodic cup of each cell in connection to the anodic member of the cell beneath it, the cathodic cup of the bottom cell being in connection to said container, the anodic member of the upper cell being in connection to said terminal with its flange being substantially fixedly positioned by an insulative means disposed between its flange and the terminal end of the container, said spring is disposed around at least one cup, spacing means disposed around the other cups, and said spring when under compression and said spacing means exceed the length of their respective cups to suspend said cells by their flanges and exert an in-line sealing force on the flanges of said cells.

8. The capacitor of claim 7 wherein said spring is a stack of Belleville washers disposed around the cathode cup of said bottom cell, and said stack having a closed length exceeding the length of the said cathode cup.

9. The capacitor of claim 7 wherein said spacing means are tubular sleeves adapted to support a cell cup by its flange and to uniformly distribute the load thereon.

10. The capacitor of claim 7 including reinforcing washers disposed on said flanges.

References Cited

UNITED STATES PATENTS 3,273,028   9/1966   Sparkes.
3,275,902   9/1966   McHugh et al.
3,297,918   1/1967   Boal.

JAMES D. KALLAM, Primary Examiner

U.S. Cl. X.R.

29—570